(12) United States Patent
Dalglish

(10) Patent No.: US 7,064,653 B2
(45) Date of Patent: Jun. 20, 2006

(54) SELECTIVE CLOAKING CIRCUIT FOR USE IN RADIO FREQUENCY IDENTIFICATION AND METHOD OF CLOAKING RFID TAGS

(75) Inventor: Dave Dalglish, Longmont, CO (US)

(73) Assignee: Single Chip Systems Corporation, San Diego, CA (US)

( * ) Notice: Subject to any disclaimer, the term of this patent is extended or adjusted under 35 U.S.C. 154(b) by 0 days.

(21) Appl. No.: 10/742,610

(22) Filed: Dec. 18, 2003

(65) Prior Publication Data

US 2005/0270141 A1 Dec. 8, 2005

Related U.S. Application Data

(63) Continuation of application No. 09/768,327, filed on Jan. 23, 2001, now Pat. No. 6,690,264.

(51) Int. Cl.
*H04Q 5/22* (2006.01)
*G08B 13/14* (2006.01)
*H01Q 1/40* (2006.01)
*H01Q 1/00* (2006.01)

(52) U.S. Cl. .............. 340/10.1; 340/572.1; 340/572.4; 340/572.5; 340/572.7; 340/10.4; 343/873; 343/720

(58) Field of Classification Search ............. 340/10.1, 340/572.4, 572.5, 572.7, 10.4, 572.1; 343/873, 343/720

See application file for complete search history.

(56) References Cited

U.S. PATENT DOCUMENTS

| 5,963,144 A | 10/1999 | Kruest |
| 6,072,383 A | 6/2000 | Gallagher, III et al. |
| 6,690,264 B1 * | 2/2004 | Dalglish .................. 340/10.4 |

FOREIGN PATENT DOCUMENTS

| EP | 1030266 A | 8/2000 |
| WO | WO98/29826 A | 9/1998 |
| WO | WO99/49410 A | 9/1999 |

* cited by examiner

*Primary Examiner*—Jeffery Hofsass
*Assistant Examiner*—Scott Au
(74) *Attorney, Agent, or Firm*—Baker & McKenzie LLP

(57) ABSTRACT

The output to the antenna of an RFID tag or label is disconnected from the balance of the RFID chip by means of a series switch activated in response to a logic command, CLOAK, generated by the RFID chip. Activation of the switch disconnects the output to the antenna of the RFID tag without disconnecting its input. The output to the antenna is thus disconnected for a time sufficient to allow the remaining RFID tags in an RF interrogation field to be identified. However, the input of the antenna remains connected and is capable of receiving at any time, including during the cloaking period commands which can lift the tag out of cloaking and allow it to then selectively output its signal.

17 Claims, 2 Drawing Sheets

US 7,064,653 B2

SELECTIVE CLOAKING CIRCUIT FOR USE IN RADIO FREQUENCY IDENTIFICATION AND METHOD OF CLOAKING RFID TAGS

This application claims priority as a continuation application under 35 U.S.C. 120 to U.S. Utility patent application Ser. No. 09/768,327 is U.S. Pat. No. 6,690,264 entitled "A SELECTIVE CLOAKING CIRCUIT FOR USE IN A RADIOFREQUENCY IDENTIFICATION AND METHOD OF CLOAKING RFID TAGS", filed on Jan. 23, 2001, which is incorporated herein by reference in its entirety.

BACKGROUND OF THE INVENTION

1. Field of the Invention

The invention relates to radio frequency identification tags or labels and in particular to a cloaking circuit used to assist in the read operations of RFID transponders.

2. Description of the Prior Art

In U.S. Pat. No. 5,963,144, incorporated herein by reference, what is described is an antenna of an RFID tag or label which is disconnected from the balance of the RFID chip by means of a series switch activated in response to a logic command, CLOAK, generated by the RFID chip. Activation of the switch disconnects the antenna of the RFID tag from the remainder of the RFID chip and effects a high impedance resistance across the antenna terminals. An RC circuit is charged by activation of the CLOAK signal and thereafter discharges during a predetermined RC time period as determined by a high impedance series antifuse leakage transistor. The antenna is thus disconnected for a time sufficient to allow the remaining RFID tags in an RF interrogation field to be identified. Meanwhile, during the disconnection of the antenna from the RFID chip and its loading causes its effective absorption and scattering aperture to be reduced to near zero so as to electromagnetically remove the RFID tag from the zone of interrogation during the predetermined time period. Hence, the interrogated tag remains disconnected and noninterferring with the RF field used to interrogate the remaining tags. It is also known to detune the tag's antenna by at least partially shorting out the antenna, as either a means of signaling or for depleting the energy stored in the antenna resonant structure.

Thus what is taught is disconnecting the front end of the RFID chip even during times when the power to the tag has been removed. This could be accomplished by open circuiting the data path and/or the power input. Unfortunately, this means that while the chip is in the Cloak state, it is impossible for the reader to communicate with the tag.

As an example, a tag with a cloak time of 20 seconds might be interrogated and then cloaked while on a conveyor belt. But it might be necessary to read the label subsequently when the tag has traveled further down the conveyor belt but within the 20 second time period.

What is needed is a circuit and method that allows a tag to be cloaked, but still to be interrogated when it is cloaked.

BRIEF SUMMARY OF THE INVENTION

The invention is defined as an improvement in a cloaked RFID tag having an antenna comprising a switch and a logic circuit coupled to the switch. The logic circuit or gate selectively allows communication of signals through the antenna during normal operation to thereby allow output of a signal from the RFID tag through the antenna and to disable the RFID output during a cloaking period. A receiving connection is provided to the RFID tag so that command signals are continuously receivable notwithstanding cloaking of the RFID tag.

The RFID tag includes an input circuit. The receiving connection is an electrical connection between the antenna and the input circuit which is not interrupted by operation of the switch. The electrical connection comprises a diode coupled between the antenna and the input circuit. The switch is a grounding switch, such as a switching transistor, coupled between the antenna and ground. The switch communicates signals through the antenna by selectively grounding the antenna according to the signals during the normal operation. The logic circuit couples signals to the switch to ground the antenna during the normal operation and isolates signals from the switch during the cloaking operation. Further power is supplied through the antenna to the RFID circuit during the cloaking operation.

The invention further comprises a method for performing the foregoing operations.

The invention now having been summarized, turn to the following drawing in which like elements are referenced by like numerals.

Figure 1:
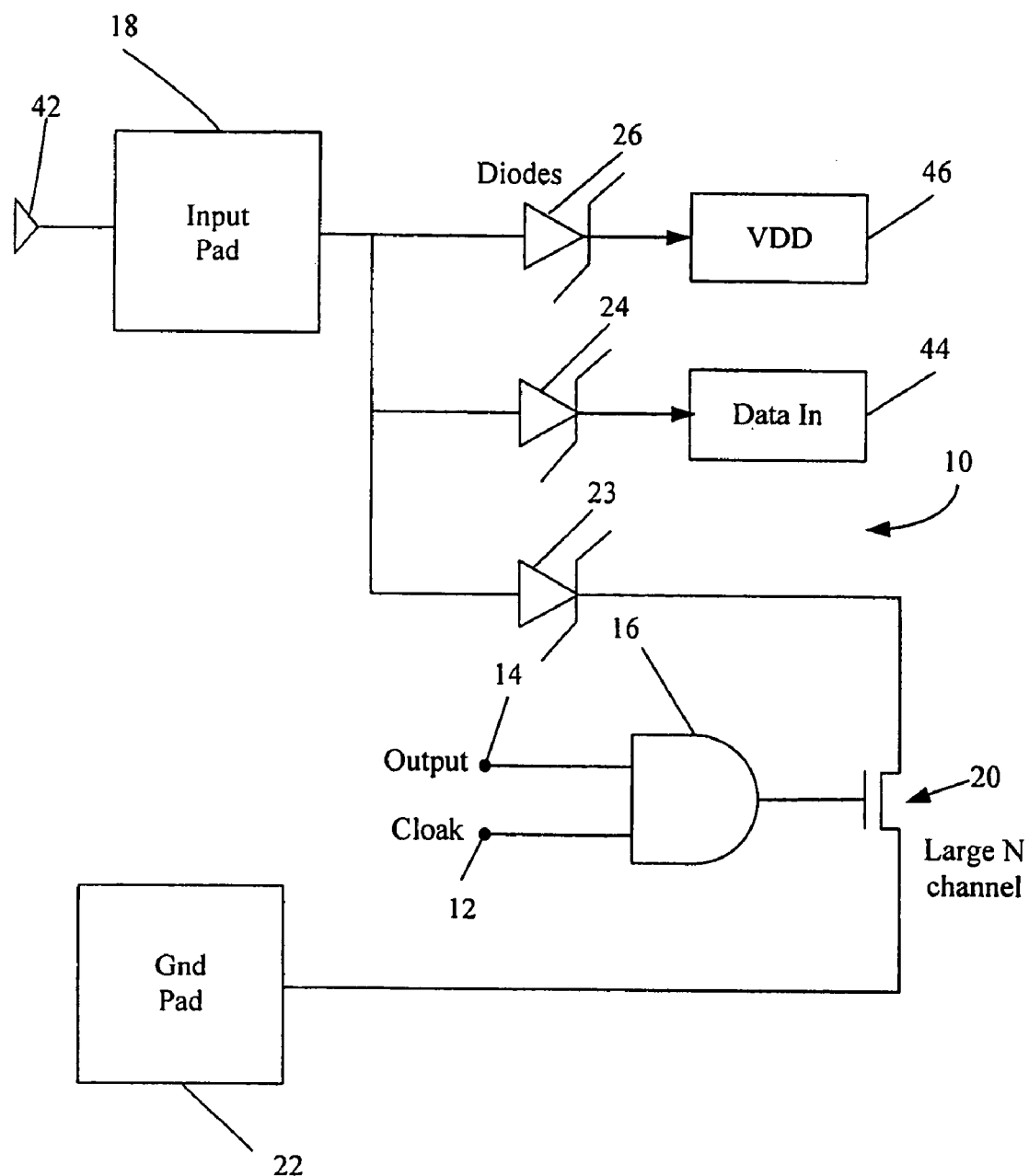
FIG. 1 is a simplified circuit diagram of the illustrated embodiment where the RFID tag remains in a condition in which command signals can be received during the cloaking period and in response to which the tag may be awakened on command.

The invention now having been visualized in the foregoing drawings, the invention and its various embodiments may now be better understood by turning to the following detailed description of preferred embodiments.

DETAILED DESCRIPTION OF PREFERRED EMBODIMENTS

In the present invention the chip's output is disabled so that the chip cannot respond even though it is receiving information from the reader. The advantage of such a scheme is that a command can be introduced such that the Cloak state could be overcome allowing the tag 10 to respond during the Cloak period. The normal command waking the chip is still used such that any tag 10 in the Cloak state would still not be detected.

Before discussing this improvement, first consider some foundational background information concerning the operation of a cloaked RFID tag 10 in general. Cloaking a circuit or RFID tag 10 effectively disconnects the tag's antenna 42 from the rest of the tag 10. This effective disconnection is done by means of circuits on the RFID tag 10 that are designed to: (1) form a series switch between the antenna terminals and the logic circuitry of a chip comprising the tag 10; and (2) provide a means to maintain the switch in an open or antenna-disconnected state for a time period significantly long enough relative to the time required to identify remaining tags in the RF field. The time periods are determined by the voltage decay of a resistor-capacitor circuit which continues to perform its function even when the tag 10 power is removed. In the illustrated embodiment, an anti-fuse structure is used as a high-valued resistor to achieve these long RC time cost delays. Without the improvement to the invention disclosed below the antenna 42 of the RFID tag 10 remains disconnected or loaded by a high impedance during the power on/off cycles, in the absence of the powering RF field and until the RC delay times out. The time delays are dependent on the exact process parameters utilized in fabricating the RFID tag 10 and typically may be in the range of 2–100 seconds.

During this time-out period, the impedance coupled to the antenna 42 terminals by the RFID chip is raised sufficiently high so that the antenna 42 appears to be effectively open-circuited. This causes the antenna 42 and the RFID tag 10 to have both reduced absorption and reflection of the RF energy. This in turn amounts to a novel application of antenna theory, where an antenna 42 whose terminals are open-circuited, both have a minimum effective absorption and scattering aperture for the RF interrogation and power field.

The advantage of the performance of an RFID system of the invention is that during the time that the antenna 42 is effectively disconnected, the tag 10 appears less visible in the RF field or is cloaked. The cloaked antenna 42 interferes less with other tags, which are then going through the interrogation or identification process. Further, as each tag 10 is in turn identified, a coded signal is transmitted to tell the identified tag 10 to cloak itself. When in the cloaked state, this allows therefore more energy in the RF field to be available for reading the remaining tags in the interrogation zone. The overall capacity to read and identify multiple tags within the read range of a RFID system is significantly improved as a result of applying this concept.

Turn now and consider the improvement of the cloaking system described above as shown in FIG. 1 by circuit 10 which is included in an RFID tag. In normal operation (cloak not activated), the "Cloak bar" node 12 coupled to the input of AND gate 16 is high. Whenever "Output" on node 14 goes high (typically for 1 to 2 psec) input pad 18 to which the tag antenna is connected is shorted. In other words with both Output node 14 and Cloak bar node 12 high, AND gate 16 has a high output coupled to the gate of transistor 20, which then couples pad 18 through diode to ground pad 22. This causes a backscattered signal from the grounded tag antenna 42 coupled to pad 18 to be produced and then detected by the RFID reader.

Figure 2:
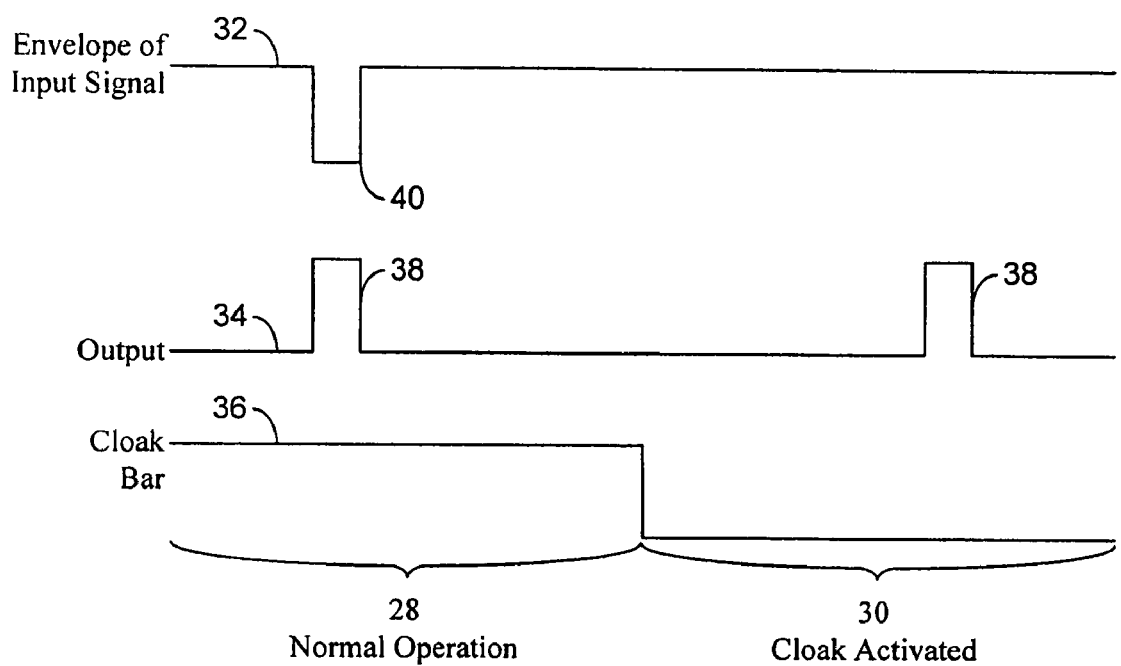
FIG. 2 is a timing diagram of the operation of the circuit of FIG. 1.

FIG. 2 is a timing diagram of the relevant signals in which the envelope of the input signal is shown on line 32, the Output at node 14 on line 34 and Cloak baron line 36. During normal operation 28 when Output goes high at node 14 as shown by pulse 38, a backscattered pulse 40 will be presented on pad 18, i.e. a momentary grounding of the antenna 42. However, during a cloaked period 30, Output pulse 38 is cut off from the antenna 42. In the cloak mode (cloak activated), the "Cloak bar" node 12 is low. Therefore, the output of the AND gate 16 remains low at all times and no signal can be backscattered from the RFID tag 10.

However, as shown in FIG. 1 input pad 18 is connected at all times through diode 24 to the input stages 44 of the RFID tag 10 and power continues to be supplied to the tag 10 through diode 26 to the tag power circuitry 46. Thus, commands may thus be sensed, read and processed by RFID tag 10 even when the output of the tag 10 is cloaked. With the improvement the tag 10 can now be brought out of out a cloaked state for subsequent interrogations by the reader. A command can be transmitted, sensed and processed at any time through the antenna 42, input pad 18, and to the tag input circuitry 44 through diode 24 to bring Cloak Bar high and allow the antenna signal to be controlled by Output at node 14.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

What is claimed:

1. A method of operating an RFID tag comprising:
disabling an output of an RFID tag during a cloaking operation;
receiving input transmissions regardless of the cloaking operation;
enabling the output of the RFID tag responsive to an input transmission received during the cloaking operation.

2. The method of claim 1, wherein the disabling step comprises causing a switch to open.

3. The method of claim 1, wherein the disabling step comprises causing a transistor to turn off.

4. The method of claim 1, wherein the disabling step comprises disconnecting an antenna of the RFID tag from ground.

5. The method of claim 1, wherein the disabling step comprises disabling backscattering from the RFID tag.

6. The method of claim 1, wherein the receiving step comprises connecting an antenna of the RFID tag to a receive portion of the RFID tag regardless of the cloaking operation.

7. The method of claim 6, wherein the connection between an antenna of the RFID tag and a receive portion of the RFID tag is continuous.

8. The method of claim 1, wherein the enabling step comprises causing a switch to close responsive to the input transmission received during the cloaking operation.

9. The method of claim 1, wherein the enabling step comprises causing a transistor to turn on responsive to the input transmission received during the cloaking operation.

10. The method of claim 1, wherein the enabling step comprises connecting an antenna of the RFID tag to ground responsive to the input transmission received during the cloaking operation.

11. The method of claim 1, wherein the enabling step comprises enabling backscattering from the RFID tag.

12. The method of claim 1, further comprising supplying power through an antenna of the RFID tag during a cloaking operation.

13. The method of claim 1, further comprising receiving command signals through an antenna of the RFID tag.

14. The method of claim 13, wherein the command signals can be received during a cloaking operation.

15. The method of claim 1, further comprising communicating data signals through an antenna of the RFID tag by grounding the antenna so as to cause backscattering of a received signal.

16. The method claim 15, wherein the communicating of data signals occurs when uncloaked.

17. The method of claim 15, wherein the communicating of data signals occurs responsive to command to the RFID tag received during the cloaking operation.

* * * * *